United States Patent
Arulanandan et al.

(10) Patent No.: US 11,816,943 B2
(45) Date of Patent: Nov. 14, 2023

(54) SYSTEM AND METHOD FOR VISUALLY AIDED ACCESS CONTROL

(71) Applicant: Carrier Corporation, Palm Beach Gardens, FL (US)

(72) Inventors: Alex Raj Arulanandan, Coonoor (IN); Nadeem Shaikh, Hyderabad (IN); YusufAli Ay, Madurai (IN); Avineet Nanda, Sirsa (IN); Ramesh Lingala, Hyderabad (IN)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 17/305,519

(22) Filed: Jul. 9, 2021

(65) Prior Publication Data

US 2022/0020238 A1 Jan. 20, 2022

Related U.S. Application Data

(60) Provisional application No. 62/705,748, filed on Jul. 14, 2020.

(51) Int. Cl.
*G07C 9/22* (2020.01)
*G05B 15/02* (2006.01)

(52) U.S. Cl.
CPC ............. *G07C 9/22* (2020.01); *G05B 15/02* (2013.01)

(58) Field of Classification Search
None
See application file for complete search history.

(56) References Cited

U.S. PATENT DOCUMENTS

| | | | | |
|---|---|---|---|---|
| 9,830,790 B2* | 11/2017 | Jones | ..................... | H04N 7/186 |
| 10,015,653 B2 | 7/2018 | Lang et al. | | |
| 10,540,835 B2* | 1/2020 | Kuenzi | ................. | H04W 12/02 |
| 10,708,507 B1* | 7/2020 | Dawson | ............... | H04N 23/695 |
| 10,771,470 B2* | 9/2020 | Warrick | ................... | G06F 21/31 |
| 11,067,978 B2* | 7/2021 | Nagashima | .......... | G05D 1/0038 |

(Continued)

FOREIGN PATENT DOCUMENTS

EP 1416776 A2 5/2004

OTHER PUBLICATIONS

EP Application No. 21185427.8, Extended Search Report, dated Dec. 16, 2021, 8 pages.

*Primary Examiner* — Muhammad Adnan
(74) *Attorney, Agent, or Firm* — Souad Hakim (57) ABSTRACT

An access control system including a building management system in communication with a wireless device, a smart lighting system and a locking device, wherein the building management system communicates and assigns a lighting attribute to at least one of the wireless device, the smart lighting system and the locking device; and method for providing visually aided access to a building location including: assigning a lighting attribute by a building management system to a user; communicating the lighting attribute from the building management system to a wireless device of the user; displaying the lighting attribute on the wireless device; communicating the lighting attribute to a smart lighting system in communication with the building management system, to display the lighting attribute; and terminating the lighting attribute when a locking device in communication with the building management system has been opened by the user.

20 Claims, 2 Drawing Sheets

(56) References Cited

U.S. PATENT DOCUMENTS

| | | | |
|---|---|---|---|
| 2011/0022201 A1* | 1/2011 | Reumerman | H05B 47/10 |
| | | | 700/90 |
| 2012/0092183 A1 | 4/2012 | Corbett | |
| 2016/0364135 A1* | 12/2016 | Park | G06Q 20/36 |
| 2017/0334394 A1* | 11/2017 | Menard | G07C 9/00309 |
| 2018/0037155 A1 | 2/2018 | Danowski et al. | |
| 2018/0077648 A1* | 3/2018 | Nguyen | H04L 51/18 |
| 2018/0247065 A1* | 8/2018 | Rhee | G06V 40/1365 |
| 2019/0098725 A1 | 3/2019 | Sadwick et al. | |
| 2019/0180534 A1* | 6/2019 | Santhosh | G07C 9/29 |
| 2019/0196432 A1* | 6/2019 | Morley | G05B 15/02 |
| 2019/0236877 A1* | 8/2019 | Scoggins | G07C 9/28 |
| 2019/0264939 A1* | 8/2019 | Atchison | F24F 11/64 |
| 2019/0310320 A1* | 10/2019 | Lingala | G01R 31/392 |
| 2019/0332787 A1* | 10/2019 | Graf | G06F 16/95 |
| 2019/0392422 A1* | 12/2019 | Yim | H04W 12/37 |
| 2020/0074753 A1* | 3/2020 | Adiga | G07F 17/244 |
| 2020/0077483 A1 | 3/2020 | Agarwal et al. | |
| 2020/0105969 A1* | 4/2020 | Dimitropoulos | H01L 33/24 |
| 2020/0201338 A1* | 6/2020 | Wang | H04W 4/029 |
| 2020/0363779 A1* | 11/2020 | Katsu | F24F 11/52 |
| 2020/0401091 A1* | 12/2020 | Leonardi | H05B 47/10 |
| 2021/0082215 A1* | 3/2021 | Lee | G06F 3/04883 |
| 2021/0209880 A1* | 7/2021 | Rydkin | G08B 7/06 |
| 2021/0390810 A1* | 12/2021 | Kuenzi | G07C 9/37 |
| 2021/0393131 A1* | 12/2021 | Kawajiri | G07C 9/28 |
| 2022/0245983 A1* | 8/2022 | Park | G07C 9/28 |
| 2022/0306165 A1* | 9/2022 | Brown | G08G 1/005 |

\* cited by examiner

SYSTEM AND METHOD FOR VISUALLY AIDED ACCESS CONTROL

CROSS REFERENCE TO A RELATED APPLICATION

The application claims the benefit of U.S. Provisional Application No. 62/705,748 filed Jul. 14, 2020, the contents of which are hereby incorporated in their entirety.

BACKGROUND

The subject matter disclosed herein relates to building access control, for example, for providing visually aided access control to an assigned location in a building such as a room in a multi-room facility.

Multi-room or multi-suite facilities, such as hotels, apartment buildings, office complexes, dormitories, office buildings, classrooms, cruise ships and laboratory facilities, and similar structures have spaces that are designed for serial use by multiple users. In a typical hotel setting, a guest will check-in at a front desk to obtain a room assignment and access credentials, such as a room key. In some instances, the guest may check-in remotely, and may be provided only with a room number and a remote access key, or the guest may obtain access credentials automatically and seamlessly, upon arrival, through a hotel mobile application (mobile app). In either instance, finding a location such as an assigned room in a large unfamiliar building, can cause discomfort and anxiety in a guest or visitor. While some buildings may provide directions at check-in or may have a map in lobby, these are generally unhelpful once the guest arrives on his or her assigned floor especially where an assigned floor may have multiple hallways and many doors which are generally indistinguishable to the guest.

Assigning a one-time unique visual indicator to a guest to guide the guest to an assigned location (e.g., room) can have several advantages. In first instance, it may reduce or eliminate the need for the guest to stop at the front desk, which can save time for the guest. In addition, it may also reduce the burden on front desk personnel who would otherwise be expected to provide room directions multiple times a day. In addition, the visitor or guest may prefer less direct personal interaction, when an alternate solution for locating a guest room may be available.

What is needed then, is an effective solution for improving the visitor or guest experience by a system and method for providing visually aided access to an assigned location, such as a hotel room, as further described below.

BRIEF DESCRIPTION

According to one non-limiting embodiment, an access control system for providing visually aided access to a building location comprising a building management system in communication with a wireless device, a smart lighting system and a locking device, the building management system configured to assign a lighting attribute to at least one of the wireless device, the smart lighting system and the locking device.

In addition to one or more of the features described above, or as an alternative, in further embodiment, an access control system wherein the building management system, comprises a server.

In addition to one or more of the features described above, or as an alternative, in further embodiment, an access control system wherein the wireless device comprises at least one of a mobile phone, PDA, tablet or computer, smart watch, fit device.

In addition to one or more of the features described above, or as an alternative, in further embodiment, an access control system wherein the smart lighting system comprises a plurality of addressable lighting fixtures configured to display at least one lighting attribute associated with at least one of the wireless device and the locking device.

In addition to one or more of the features described above, or as an alternative, in further embodiment, an access control system wherein the lighting fixtures comprise light emitting diodes.

In addition to one or more of the features described above, or as an alternative, in further embodiment, an access control system wherein the lighting attribute comprises at least one of a color, intensity, brightness, direction, timed frequency and pattern.

According to one non-limiting embodiment, a method for providing visually aided access to a building location, the method comprising: assigning a lighting attribute by a building management system to a user; communicating the lighting attribute from the building management system to a wireless device of the user; displaying the lighting attribute on the wireless device; communicating the lighting attribute to a smart lighting system in communication with the building management system, to display the lighting attribute; terminating the lighting attribute when a locking device in communication with the building management system has been opened by the user.

In addition to one or more of the features described above, or as an alternative, in further embodiment, a method for providing visually aided access to a building location, further comprising opening a connection between the wireless device and the building management system to activate the smart lighting system to display the lighting attribute.

In addition to one or more of the features described above, or as an alternative, in further embodiment, a method for providing visually aided access to a building location, further comprising communicating the lighting attribute to the locking device in communication with the building management system, to display the lighting attribute.

In addition to one or more of the features described above, or as an alternative, in further embodiment, a method for providing visually aided access to a building location, further comprising opening a connection between the wireless device and the locking device.

In addition to one or more of the features described above, or as an alternative, in further embodiment, a method for providing visually aided access to a building location, further comprising beaconing a data packet providing information from the locking device to a wireless device in a local area without requiring a bi-directional connection, to associate the lighting attribute and the locking device with at least one of the wireless device and the smart lighting system, to permit the user to unlock the locking device.

In addition to one or more of the features described above, or as an alternative, in further embodiment, a method for providing visually aided access to a building location, further comprising performing data exchanges between the building management system and the locking device by way of the wireless device.

In addition to one or more of the features described above, or as an alternative, in further embodiment, a method for providing visually aided access to a building location, further comprising beaconing a second data packet from the locking device to the wireless device terminating the lighting attribute when the locking device status is changed to an unlocked state.

In addition to one or more of the features described above, or as an alternative, in further embodiment, a method for providing visually aided access to a building location, wherein the lighting attribute comprises at least one of a color, intensity, brightness, direction, timed frequency, and pattern.

In addition to one or more of the features described above, or as an alternative, in further embodiment, a method for providing visually aided access to a building location, wherein the smart lighting system comprises a plurality of addressable lighting fixtures configured to display at least one lighting attribute.

In addition to one or more of the features described above, or as an alternative, in further embodiment, a method for providing visually aided access to a building location, wherein a wireless device comprises at least one of a mobile phone, PDA, tablet or computer, smart watch, fit device.

In addition to one or more of the features described above, or as an alternative, in further embodiment, a method for providing visually aided access to a building location, wherein the building comprises a multi-room facility.

In addition to one or more of the features described above, or as an alternative, in further embodiment, a method for providing visually aided access to a building location, wherein the multi-room facility comprises at least one of a hotel, a housing facility, an office building, an educational building, a cruise ship and a research facility.

In addition to one or more of the features described above, or as an alternative, in further embodiment, a method for providing visually aided access to a building location, wherein the building location comprises an assigned room.

In addition to one or more of the features described above, or as an alternative, in further embodiment, a method for providing visually aided access to a building location, wherein the assigned room comprises at least one of a hotel room, a residential unit, an office, a classroom, a dormitory room, a ship's cabin, a laboratory.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings.

DETAILED DESCRIPTION

The present invention is applicable in various multi-room or multi-suite facilities, including, but not limited to hotels, housing facilities (e.g., multi-unit apartment building or condominium buildings), office buildings, educational buildings (e.g., classrooms, dormitories) cruise ships, research facilities, and similar structures that have spaces designed for serial use (e.g., an assigned location or assigned room) by multiple users, such as visitors or guests. It should be evident to one skilled in the art that the present disclosure is not limited to the specific examples given and could be used in other multi-room or multi-suite facilities.

In a typical hotel, guests may arrive for check-in to a hotel throughout the day, and in some cases, multiple guests may arrive at the same time or nearly the same time as other guests. In some instances, a guest upon arrival may visit the front desk of a hotel to receive a room assignment and room key, as well as directions to the assigned room. In other instances, a guest that has a wireless device, such as a smart phone, may receive a room assignment, a virtual room key upon arrival (e.g., by remote check-in, hotel kiosk or mobile app), and instructions such as an email or map for purposes of locating his assigned room.

Figure 1:
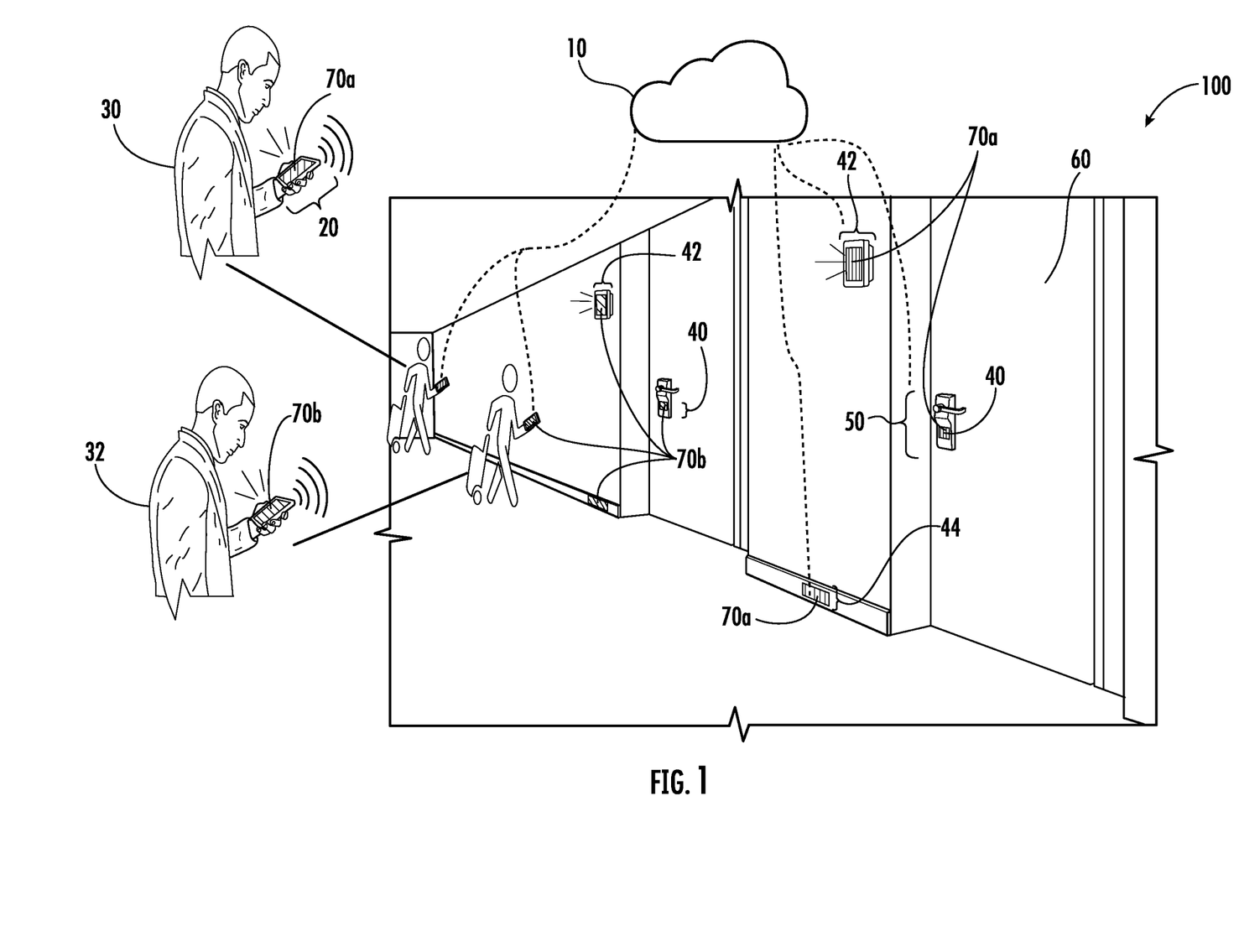
FIG. 1 illustrates an access control system in accordance with embodiments of the disclosure.

In general, the access control system 100 provides an authorized user (e.g., 30, 32) such as a hotel visitor or guest, visually aided access to a location such as an assigned room 60 in a hotel. As will be described below, the access control system 100 may include a building or facility management system (BMS) that provides for network communication by and among the related BMS systems, subsystems and devices, and also with the wireless device 20 of a user 30, 32, via a BMS associated server 10.

As further described below, upon arrival or check-in, the BMS may communicate credentials to the wireless device 20 of a user 30, 32. Credentials may include a virtual key to unlock a locking device 50. Credentials may also include the assignment of a one-time unique lighting attribute 70a, 70b associated with each individual user 30, 32 until the user reaches the assigned location and/or until the user has unlocked a locking device 50. The BMS may be configured to assign a plurality of lighting attributes 70a, 70b to a plurality of users 30, 32 such that a different lighting attribute is uniquely assigned and displayed to each user 30, 32 as further described below. Each assigned lighting attribute may be displayed by at least one of the wireless device 20, the smart lighting system and the locking device 50 to guide a user 30, 32 to an assigned location, such as a hotel room having a locking device 50. Once the user 30, 32 has unlocked the locking device 50, the BMS communicates with at least one of the wireless device 20, the smart lighting system and the locking device 50 to deactivate the lighting attribute 70a, 70b such that the lighting attribute is no longer visually displayed. The lighting attribute 70a, 70b may then be assigned to another user 30, 32.

FIG. 1 illustrates an access control system 100 in accordance with embodiments of the disclosure. The access control system 100 includes a building management system having a server 10 in communication with a wireless device 20 of a user 30, 32, a smart lighting system including lighting fixtures 40, 42, 44 and a locking device 50. Reference will now be made to the drawings wherein like reference numerals identify similar structural features or aspects of the subject disclosure.

A building management system (BMS) is, in general, hardware and/or software configured to control, monitor, and manage subsystems and devices in or around a building or buildings. BMS subsystems or devices can include heating, ventilation, and air conditioning and refrigeration systems (HVAC/R), security systems and devices which may include access control devices such as locking device 50, lighting systems or devices, such as a smart lighting system having lighting fixtures 40, 42, 44, fire alerting systems or devices, elevator systems or devices, other devices that are capable of managing building functions, or any combination thereof. The BMS may also include a property management system (PMS) to manage reservations, billing and guest profiles as well as other accounting and property management functions. As further described below, the BMS also includes systems and components for generating and assigning a one-time unique lighting attribute 70a, 70b to each user 30, 32.

The BMS may include a server 10 in communication with a communication interface and related systems, subsystems and components for conducting wireless communication within or outside of a building, for example, the communication among the various building subsystems, and with wireless devices (e.g., 20) under certain circumstances. For example, the BMS may include a server 10, such as a cloud computing system that is network connected (e.g., an internet connection, a LAN, WAN OR WLAN connection) to one or more subsystems, devices or modules. The server 10 may be configured to be in one-way or two-way communication with wireless device 20, the smart lighting system such as lighting fixtures 40, 42, 44, and the access control system, such as locking device 50 associated with an assigned room 60. As assigned room 60 is described for illustrative purposes only. An assigned room 60 may include any room in a commercial or residential facility where a user 30, 32 may engage in a variety of activities, including but not limited to, work (e.g., office, factory, laboratory), rest or sleep (e.g., hotel, residential unit, ship's cabin, dormitory), dining (e.g., restaurant) socializing (e.g., club), and exercising (e.g., gym).

The BMS communication interface may include one or more devices or modules configured to communicate via point-to-point (e.g., device pairing), one-to-many (e.g., broadcasting) or mesh network, such as a Wi-Fi and/or a Bluetooth® low energy communications (BLE) module and/or near-field communication (NFC) devices, NFC-enabled devices or NFC-equipped devices or ultra-wide band (UWB) enabled devices with UWB fixed stations that can communicate with locking device 50 and/or mobile device 20. The BMS server 10 may employ one or more protocols for network communication including, but not limited to: NB-IoT, eMTC, EC-GSM-IoT, LTE-M, DASH7, NB-FI, LPWAN, Ethernet, SAP, SAS, ATP, Bluetooth, GSM, TCP/IP, WiFi, ZigBee, 6LoWPAN, CAT6 Ethernet, HomePlug, and NFC communication interfaces and protocols, including NFCIP-1, NFCIP-2 and SNEP. For example, the communication interface or a wireless interface associated with locking device 50 described below, may include a Bluetooth® Smart radio configured to beacon a data packet to Bluetooth® Smart radio devices, such as locking device 50.

The wireless device 20 may include a mobile phone (smart phone), personal digital assistant (PDA), tablet computer, mini-tablet, laptop, mini-laptop, or other smart device that provides continuous or periodic sensing and combined sensor data from a combination of sensors, such as motion, biometrics, and/or GPS (e.g., a smart watch or fit device), etc., and may include a device that has or may only have short range or local-area wireless capabilities. Mobile phone generally refers to a mobile handset with at least cellular telephonic communications capabilities, computing capabilities, and wireless/short-range data communication capabilities (e.g., Bluetooth, RFID, NFC, etc.) and may also include GPS capabilities.

A user 30, 32, includes a person who is an authorized visitor of a multi-room or multi-suite facility, for example, as a guest of a hotel whose credentials have been authenticated by the BMS or PMS via server 10. Authentication services may vary based on facility, or in some instances, by location within the facility. User authentication may occur during check-in, such as when a user 30, 32 enters the facility, or visits a location such as a hotel front desk where user 30, 32 data (e.g., name, address, contact information, reservation number, payment information, biometric data, etc.) is obtained and entered into the BMS or PMS. In other instances, user authentication may occur wirelessly through the BMS communications interface. For example, user authentication may occur through use of mobile application (mobile app) for use on a wireless device 20, or in combination with a BMS device, including any electronic access control device (e.g., locking device 50, wall reader, hotel kiosk, rim panic device, etc.).

In some embodiments, upon authentication, the BMS or PMS may wirelessly communicate credentials to the user 30, 32 which may include a secure digital key that permits user 30, 32 access to authorized locations throughout the hotel, including an assigned room 60. In addition, credentials may also include the assignment of a one-time unique lighting attribute 70a, 70b that is unique to each user 30, 32, and which may be associated with each user's wireless device 20, the smart lighting system lighting fixtures 40, 42 and 44, and the locking device 50, as further described below. For example, the BMS or PMS may assign lighting attribute 70a to user 30, and lighting attribute 70b to user 32, and so on. A lighting attribute 70a, 70b may include at least one of color, intensity, brightness, direction, timed frequency, and pattern.

In general, the smart lighting system includes a plurality of lighting fixtures, e.g., 40, 42, 44, to provide a visual aid for guiding a user 30, 32 to assigned room 60, such as a hotel room. The smart lighting system may be in wired or wireless communication with the BMS or PMS. The lighting fixtures 40, 42, 44 may be addressable such that one or more may be configured to operate in accordance with instructions received from a BMS or PMS, as further described below. In some embodiments, the lighting fixtures 40, 42, 44 may include light emitting diodes (LED), or other light fixtures that generally have a long life, are energy efficient, durable and are programmable to display a lighting attribute 70a, 70b.

In some embodiments, the lighting fixtures 40, 42, 44 may be located at various places throughout the hotel, as in the hallway illustrated in FIG. 1. For example, the lighting fixtures may be operably coupled or adjacent to a locking device 50, such as lighting fixture 40. In some embodiments, the lighting fixtures may be mounted to a wall, such as lighting fixtures 42, 44 or a ceiling (not shown). It should be appreciated that the smart lighting system and lighting fixtures 40, 42, 44 may be located in various places throughout a multi-room or multi-suite facility, such a lobby, and is not limited to the illustrated example.

A locking device 50, provides access to the multi-room or multi-suite facility, such as to an assigned room 60, such as a hotel room, conference room, office, classroom, waiting area, lobby, etc. The locking device 50, in communication with the BMS or PMS, provides access to users 30, 32 who have been authenticated by the BMS or PMS and who have the proper credentials for accessing an assigned room 60, and for denying access to others (i.e., to lock and unlock a locking device 50). The locking device 50 includes a locking mechanism to selectively switch between a locked state and an unlocked state. In this example, a locking mechanism may include an electrically actuated dead bolt for selectively locking the locking device 50.

The locking device 50 may also include a wireless interface in communication with the BMS (or PMS) communication interface via server 10. The locking device 50 wireless interface may be operatively connected to the locking mechanism to control changes between a locked and an unlocked state. A magnetic strip and/or RFID card reader can also be operatively connected to the locking mechanism in a local area without requiring bi-directional connection and to support bi-directional connections as needed to transfer data to the locking device 50.

The locking device 50 wireless interface may be configured to periodically beacon a data packet providing information to a wireless device 20 in a local area without requiring a bi-directional connection and to support bi-directional connections as needed to transfer data to the locking device 50. In one non-limiting embodiment, the data packet may include the lighting attribute 70*a*, 70*b* assigned by the BMS or PMS to a user 30, 32, and to the lighting fixtures 40, 42, 44. The wireless interface may be configured to vary the beacon rate for beaconing a data packet depending on, for example, the instructions provided to the lighting smart system or other suitable factors such as the reservation status of a user 30, 32, time of day, day of the week, the estimated time to reach the locking device 50 from a local check-in location (e.g., front door, lobby, front desk, check-in kiosk, etc.), or proximity of a user 30, 32 to a locking device 50. The locking device may also include a controller configured to vary the transmission power/amplitude of the beaconing data packet, for example, on the foregoing factors.

The BMS, PMS and associated controllers for the smart lighting system and/or the locking device 50 may include a processor, memory, and storage for software/firmware with non-transitory instructions for implementing method steps further described below.

In another non-limiting embodiment, the lighting system 40, 42, 44 will be enabled the offline mesh network as well. For example, a user 30, 32 having a mobile device 20 may come within range of a location, such as the front desk. In this example, the mobile device 20 will obtain data pertaining to the assigned room 60 (e.g., access credential, room assignment, location data) over a BLE mesh network, causing the lighting fixtures 40, 42, 44 to illuminate guiding the user 30, 32 to the assigned room 60. Once the user 30, 32 reaches the assigned room 60 and unlocks the locking device 50 with valid credentials, then the locking device 50 may sense the unlocking event (e.g., through a handle switch sensor), and send a signal to turn off the lighting fixtures 40, 42, 44. For example, the locking device 50 may send a signal to the BMS or the smart lighting system, or to the lighting fixture 40, 42, 44.

Figure 2:
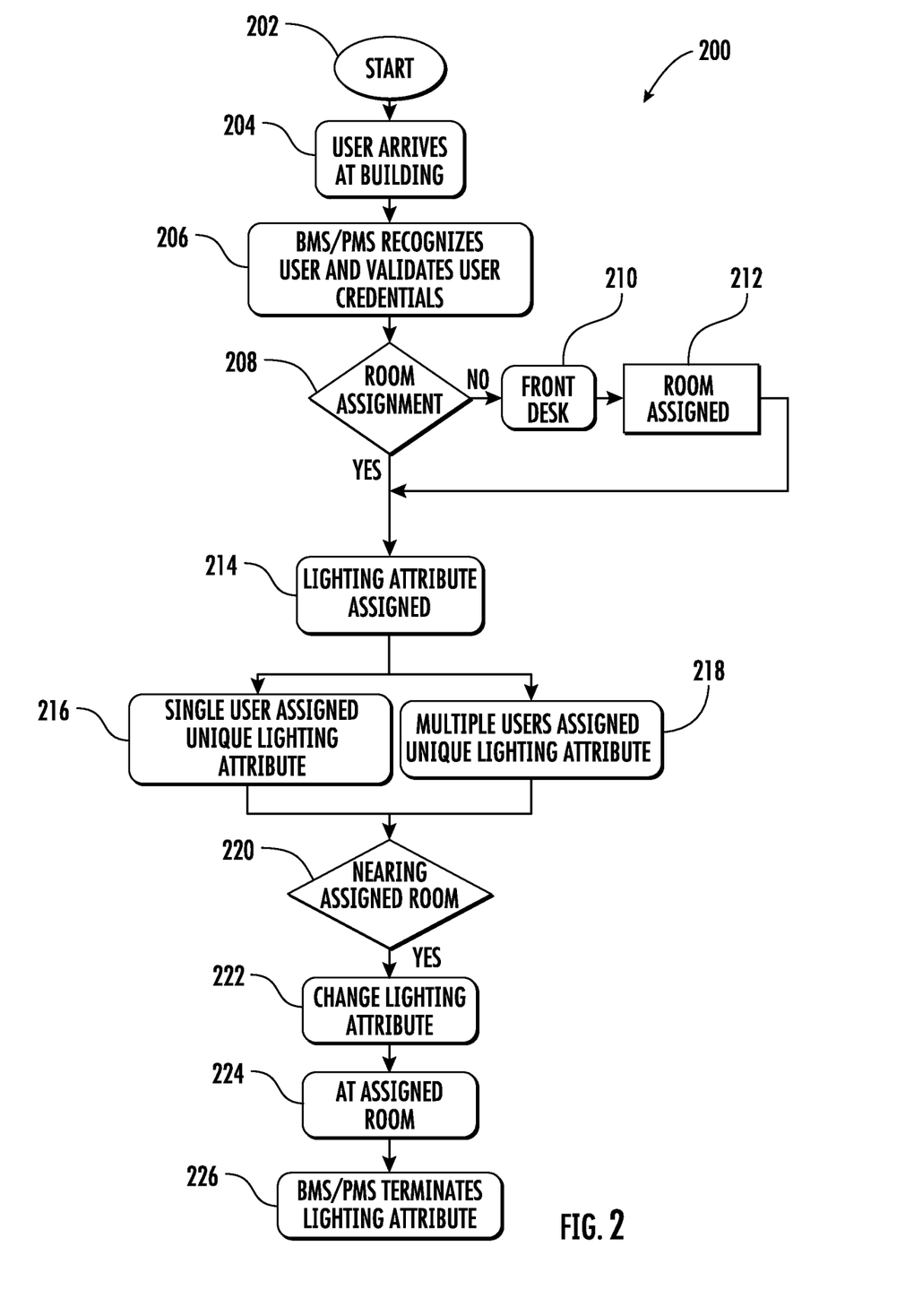
FIG. 2 illustrates a method for providing visually aided access to a building location in accordance with embodiments of the disclosure.

In another non-limiting embodiment when user 30, 32 exits the assigned room 60 and activates (locks) the locking device 50 (e.g., by hand, using a mobile app, or key card). The locking device 50, through for example a handle switch sensor, may send a signal or prompt (visual or audio) to mobile device 20 of a user 30, 32. For example, the prompt may query the user 30, 32 (e.g., "where do you want to go (facility location or destination details)"). In this example, coincident with the signal or prompt, the smart lighting system (e.g., 40, 42, 44) may also turn on to guide the user 30, 32 to the destination). FIG. 2 illustrates a method for providing visually aided access to a building location in accordance with embodiments of the disclosure. An embodiment of a method of providing visually aided access to a building location 200 in accordance with embodiments of the disclosure will now be described. The method embodiment shown in FIG. 2, can be implemented in and will be described using the BMS or PMS through a server 10. The function steps are indicated with rectangles, whereas the logic steps or questions, are shown within diamond-shaped parallelograms. In one embodiment, the flow chart of FIG. 2, or condition(s) operations blocks 202-226 can be performed periodically, repeatedly, continuously, upon operation action or responsive to the authentication of a user's credentials and assignment of a lighting attribute 70*a*, 70*b*.

The method begins at step 202 with a multi-room or multi-suite facility (e.g., hotel, housing facility, such as a multi-unit apartment building or condominium building, an office building, educational building (e.g., classrooms, dormitories), a cruise ship, a research facility, and similar structures that have spaces designed for serial use (e.g., an assigned location or assigned room) by multiple users 30, 32, such as visitors or guests.

In one non-limiting embodiment, the multi-room or multi-suite facility is a hotel having a BMS that may be communication with one or more BMS systems, subsystems (e.g., the PMS) or devices, including wireless devices 20 over a connected network (e.g., an internet connection, a LAN, WAN OR WLAN connection), using a server 10 and a communications interface. Connected BMS systems may include a PMS for managing user 30, 32 reservations, billing information, user profiles, and other data that may be necessary or appropriate to authenticate, credential and/or distinguish one user 30, 32 from another user in the BMS, a smart lighting system including lighting fixtures 40, 42, 44 and an access control system, including locking device 50.

In step 204, a user 30, 32, having a wireless device 20, arrives at the hotel. The wireless device 20 may include a mobile phone (smart phone), personal digital assistant (PDA), tablet computer, mini-tablet, laptop, mini-laptop, etc., and may include a device that has or may only have short range or local-area wireless capabilities. For example, user 30, 32 may have a mobile phone with at least cellular telephonic communications capabilities, computing capabilities, and wireless/short-range data communication capabilities (e.g., Bluetooth, RFID, NFC, etc.) and may also include GPS capabilities.

In step 206, the user 30, 32 may have a mobile application (mobile app) on his or her wireless device 20 that permits the user 30, 32 to be recognized by the BMS for purposes of authentication and/or credentialing by the BMS, and to access a secure website for remote check-in at the hotel. Check-in may occur on or off-site through the mobile app. In some embodiments, secure check-in may occur through a local device such as a wall reader, hotel kiosk or through interaction with front desk personnel. Authentication of a user 30, 32 may occur in numerous ways, including identifying the user's 30, 32 wireless device 20 and/or confirming a user's profile in a database accessible by the BMS when the user 30, 32 arrives at the hotel or interacts with front desk personnel.

In step 208, a determination is made whether the user 30, 32 has been provided an assigned room 60, such as a hotel room accessible by presenting credentials (e.g., a key, key card, virtual key, etc.) to a locking device 50. For example, a user 30, 32 who is a frequent or regular guest may have room preferences stored in his or her profile, which may permit the BMS to automatically assign a room to a user 30, 32 based on preference and room availability. In this example, the BMS may fetch a room assignment from a room availability database and assign a room to the user 30, 32. Alternatively, the BMS may not have assigned a room to the user 30, 32, in which event, the user 30, 32 may, in step 210, be directed to the hotel front desk services. In this event, the front desk services may assign a room to the user 30, 32 through the BMS. When a user 30, 32 has received a room assignment, then the method continues to step 214.

In step 214, the BMS assigns a one-time, unique lighting attribute to the user 30, 32 which may be displayed on at least one of the user's wireless device 20 via mobile app, the smart lighting system via lighting elements 40, 42, 44 and the locking device 50. For example, user 30 may be assigned lighting attribute 70a (e.g., a RED color). The BMS also assigns the same lighting attribute 70a to the smart lighting system (e.g., lighting fixtures 40, 42, 44) and/or the locking device 50. Similarly, user 32 may be assigned lighting attribute 70b (e.g., a GREEN color). The BMS also assigns the same lighting attribute 70b to the smart lighting system and/or the locking device 50.

In one non-limiting embodiment, the smart lighting system, may include a plurality of addressable lighting fixtures 40, 42, 44 which may be configured to display at least one lighting attribute associated with at least one of the wireless device 20 and the locking device 50. In some embodiments, the BMS may be configured such that different lighting fixtures 40, 42, 44 display different colors to avoid confusion. For example, the lighting fixture 42 adjacent to the locking device 50 for the room assigned to user 30, may display a RED light, while the lighting figure adjacent to the locking device associated with user 32, may display a GREEN light.

In another non-limiting embodiment, the BMS may be configured to display the lighting attribute of a user 30, 32 on the lighting fixtures 40, 42, 44, as the user 30, 32 moves through the hotel on the way to the assigned room 60. In some embodiments, the BMS may also associate the user's lighting attribute 70a, 70b with the locking device 50, so that the locking device 50 may also display the lighting attribute to guide the user to the assigned room. For example, referring to FIG. 1, user 30 may be assigned lighting attribute 70a (e.g., a RED light). In this example, a RED light may also be displayed on or adjacent to locking device 50.

In another non-limiting embodiment, the lighting attribute 70a, 70b may be displayed by the lighting fixtures 40, 42, 44 and/or the locking device as the user 30, 32 approaches within some range (e.g., 3 feet ahead and 3 behind the user 30, 32). This may avoid the lights being continuously displayed.

In step 216, once a room as been assigned to the user 30, 32 the BMS may push data to the user's mobile device 20 through the mobile app associated with that hotel to allow the user 30, 32 to display a lighting attribute on his mobile device 20. A lighting attribute may include the display of at least one of a color, a light intensity, brightness, direction, timed frequency and pattern. By way of example, referring to FIG. 1, a user 30 may be assigned a lighting attribute such as the color RED which may displayed on the wireless device of user 30 through a mobile app.

In step 218, when multiple users have each received a room assignment, the BMS may be configured to push data, that may include an assigned lighting attribute 70a, 70b . . . 70n, to a plurality of mobile devices 20n, as each user is assigned a room. In each instance, the BMS may be configured to assign a unique lighting attribute to each user 30, 32, so that users having a room assignment within a certain proximity to one another, will not be assigned the same or similar lighting attribute. By way of example, referring to FIG. 1, a user 30 may be assigned a lighting attribute (e.g., RED) which may displayed on the wireless device 20 of user 30 through a mobile app on that user's mobile device 20. A second user 32, may have also been assigned a room on the same floor or within some proximity to the room of the first user 30. In this instance, the second user 32 may be assigned a different lighting attribute (e.g., GREEN) which may be displayed through the mobile app on the second user's mobile device 20.

In some embodiments, the BMS may be configured to alter the signal relating to the lighting attribute 70a, 70b. In step 220, the method determines whether the user 30, 32 is approaching the assigned room 60. If the user 30, 32 approaches the assigned room 60, then the method proceeds to step 222 causing a change to the lighting attribute 70a, 70b. For example, the closer the user 30 is to reaching assigned room 60 and locking device 50, at least one of the wireless device 20, the lighting fixtures 40, 42, 44 and the locking device 50 may begin to flash with greater frequency or may display greater intensity (e.g., brightness). In some embodiments, proximity may also trigger an audible alert, such as a voice announcing one's arrival at the destination, or a chime or other sound. Proximity to the locking device 50 may be determined in a variety of ways, including using for example, the GPS of the mobile device 50, or a sensor in communication with the locking device 50 for sensing proximity.

In step 224, when the BMS determines that the user 30, 32 has reached the assigned room 60, it may suspend the lighting attribute 70a, 70b to permit the user to present his access credentials, such as a room key, key card, or virtual key. In step 226, when the user 30, 32 has presented his or her access credentials, the BMS terminates the lighting attribute 70a, 70b, which may now be assigned to a new user.

While the examples of the disclosed embodiments may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit Nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synch link DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

We claim:

1. An access control system for providing visually aided access to a building location, the access control system comprising:
a building management system in communication with a wireless device, a smart lighting system and a locking device, the building management system configured to assign a lighting attribute to a user;
communicating the lighting attribute from the building management system to the wireless device of the user;
displaying the lighting attribute on the wireless device;
communicating the lighting attribute to the smart lighting system to display the lighting attribute; and
terminating the lighting attribute when the locking device has been opened by the user.

2. The access control system of claim 1, wherein the building management system, comprises a server.

3. The system of claim 1, wherein the wireless device comprises at least one of a mobile phone, PDA, tablet or computer, smart watch, fit device.

4. The system of claim 1, wherein the smart lighting system comprises a plurality of addressable lighting fixtures configured to display at least one lighting attribute associated with at least one of the wireless device and the locking device.

5. The system of claim 4, wherein the lighting fixtures comprise light emitting diodes.

6. The system of claim 5, wherein the lighting attribute comprises at least one of a color, intensity, brightness, direction, timed frequency and pattern.

7. A method for providing visually aided access to a building location comprising:
assigning a lighting attribute by a building management system to a user;
communicating the lighting attribute from the building management system to a wireless device of the user;
displaying the lighting attribute on the wireless device;
communicating the lighting attribute to a smart lighting system in communication with the building management system, to display the lighting attribute; and
terminating the lighting attribute when a locking device in communication with the building management system has been opened by the user.

8. The method of claim 7, further comprising opening a connection between the wireless device and the building management system to activate the smart lighting system to display the lighting attribute.

9. The method of claim 7, further comprising communicating the lighting attribute to the locking device in communication with the building management system, to display the lighting attribute.

10. The method of claim 7, further comprising opening a connection between the wireless device and the locking device.

11. The method of claim 7, further comprising beaconing a data packet providing information from the locking device to a wireless device in a local area without requiring a bi-directional connection, to associate the lighting attribute and the locking device with at least one of the wireless device and the smart lighting system, to permit the user to unlock the locking device.

12. The method of claim 7, further comprising performing data exchanges between the building management system and the locking device by way of the wireless device.

13. The method of claim 7, further comprising beaconing a second data packet from the locking device to the wireless device terminating the lighting attribute when the locking device status is changed to an unlocked state.

14. The method of claim 7, wherein the lighting attribute comprises at least one of a color, intensity, brightness, direction, timed frequency, and pattern.

15. The method of claim 7, wherein the smart lighting system comprises a plurality of addressable lighting fixtures configured to display at least one lighting attribute.

16. The method of claim 7, wherein a wireless device comprises at least one of a mobile phone, PDA, tablet or computer, smart watch, fit device.

17. The method of claim 7, wherein the building comprises a multi-room facility.

18. The method of claim 17, wherein the multi-room facility comprises at least one of a hotel, a housing facility, an office building, an educational building, a cruise ship and a research facility.

19. The method of claim 18, wherein the building location comprises an assigned room.

20. The method of claim 19, wherein the assigned room comprises at least one of a hotel room, a residential unit, an office, a classroom, a dormitory room, a ship's cabin, a laboratory.

* * * * *